Jan. 30, 1968  G. E. HANSEN  3,366,137
SWING CHECK VALVE WITH SELF-ADJUSTING HINGE
Filed April 20, 1965

Inventor.
George E. Hansen.
By Joseph O. Lange
Atty.

United States Patent Office 3,366,137
Patented Jan. 30, 1968

3,366,137
SWING CHECK VALVE WITH SELF-ADJUSTING HINGE
George E. Hansen, Elmwood Park, Ill., assignor to Crane Co., Chicago, Ill., a corporation of Illinois
Filed Apr. 20, 1965, Ser. No. 449,430
12 Claims. (Cl. 137—527.4)

This invention relates generally to swing check valves, and, more particularly, it is concerned with a novel valve construction in which a self-aligning support for the closure member is provided.

At the outset, in order to acquire a better appreciation of the merits of this invention, it should be understood that the conventional swing check valves normally available commercially require relatively accurate machining and close alignment of the hinge pin, the closure member and the valve seat, if the desired seat tightness is to be obtained. In numerous constructions heretofore employed, the alignment of a drilled hole in the valve body or casing for the hinge pin in relation to the valve seat and closure member must be very accurately established. This is necessary in order to eliminate objectionable misalignment and any valve seat leakage under fluid pressure conditions normally encountered.

As a matter of fact, in order to provide the seat tightness referred to, it is the present practice in manufacturing swing check valves to increase the diametrical clearances between the drilled holes normally provided in the casing and in the closure member hinge and outside diameter of the hinge pin in order to minimize the danger of misalignment when the valve is seated. However, this clearance provision is objectionable because of its uncertain remedial effect and also that line fluids will detract from the proper functioning of shaft or hinge pins employed due to deposits of foreign matter or the like in the normal course of service.

Therefore, it is one of the more important objects of this invention to provide for a swing check valve construction which is not only more economical and durable, but which also is provided with what be termed a built-in flexibility in overcoming misalignment between the closure member and the valve seat.

Another important object is to provide for a swing check valve construction in which it is unnecessary to provide drilled holes in the valve body and it thereby eliminates the usual costly jigs and fixtures which are employed in current designs.

A further important object of the invention is to provide for a swing check valve construction in which it is unnecessary to employ a hinge pin cap and thereby eliminating the need for an additional pressure joint in the valve body and thus reduces manufacturing costs very substantially.

A further important object is to provide for a novel swing check valve construction in which a novel form of hinge retainer is used and upon which in cooperative relation the valve hinge pin rides. The arrangement as hereinafter described reduces the usual objectionable friction previously encountered in valves of this type, while allowing for relatively unrestrained movement during the seating operation so as to permit self-alignment and thus insuring seat tightness of the closure member with relation to the valve casing.

Another important object is to provide for a construction in which in combination with the hinge retainer above referred to the hinge pin employed is held securely in place by means of the counterbore in the valve cap and thus eliminating all connections of the hinge pin previously employed with relation to the body. Thus the hinge pin cannot accidentally fall out or become disengaged during the course of service after the assembly hereinafter to be described in detail.

Another important object is to provide for a swing check valve construction in which the hinge retainer is suitably apertured to permit flexibility of positioning the hinge in relation to the valve seat.

Other important objects and advantages of this invention will become more readily apparent upon proceeding with the specification read in light of the accompanying drawings, in which.

Similar reference numerals refer to similar parts throughout the several views.

Figure 1:
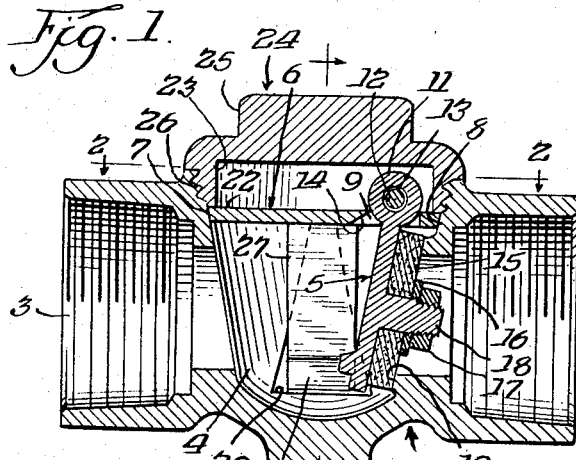
FIG. 1 is a sectional assembly view of a preferred form of a swing check valve embodying my invention.

Referring now to FIG. 1, a swing check valve casing or body generally designated 1 is shown which is provided with the usual inlet connection 2 and the outlet connection 3 and with a valve chamber 4 between said inlet and outlet within which the swingable valve closure member generally designated 5 is mounted.

Figure 3:
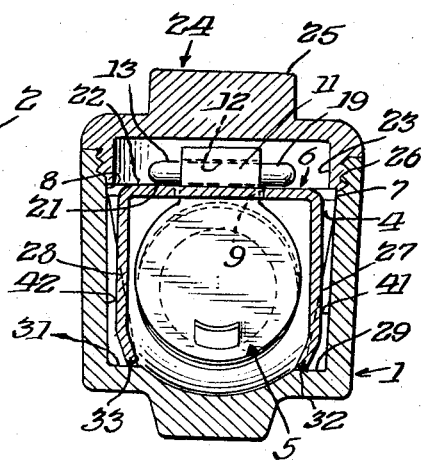
FIG. 3 is a transverse sectional assembly view taken on the line 3—3 of FIG. 1.

Forming the subject matter of this invention, the hinge retainer 6 is mounted in the said chamber as illustrated so that its outer edge or peripheral portions as indicated at 7 are abuttingly received upon the tapered annular surface 8 of the casing 1 as shown in FIGS. 1 and 3. It will be noted that the hinge retainer 6 is suitably relieved or apertured as at 9 to permit the closure member hinge 11 to project therethrough as shown. While an aperture has been shown, a suitable slot may be used for such purpose.

The hinge 11 is transversely drilled as at 12 to receive the hinge pin 13. It will also be noted that in order to permit of the desired swinging movement of the closure member hinge 11 in relation to the seat 10, the aperture 9 (or the slot) is suitably formed on its underside with surface 14 to permit full lift or such swinging movement as is desired of the closure member 5 during the course of operation. The closure member 5 is provided with the usual seating disk 15 and is retained to the closure member 5 by means of the disk washer 16. The retaining nut 17 in this connection threadedly engages the shank 18.

Figure 2:
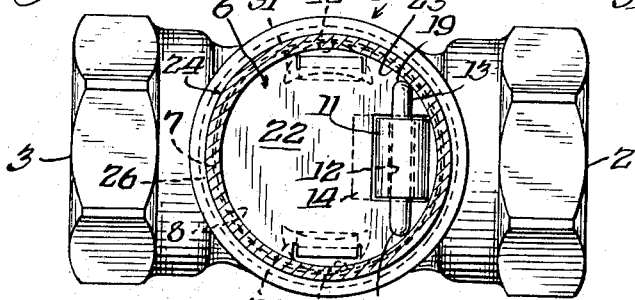
FIG. 2 is a sectional assembly view taken on the line 2—2 of FIG. 1.

It will be noted as more clearly shown in FIG. 3 that the hinge pin 13 is preferably of a length sufficient to span the aperture 9 and at its extended end portions 19 and 21 is supported upon the outer surface 22 of the hinge retainer 6 as shown more clearly in FIGS. 2 and 3. The length of the hinge pin 13 as more clearly shown in FIG. 2 is preferably made of such proportions that it is received with suitable end clearances within the counterbore surface 23 of the threaded valve cap generally designated 24. The latter member has the usual outer formed portion 25 for attachment of a wrench when it becomes necessary to assemble or to disassemble the valve.

From the description in FIG. 2 of the positioning of the hinge pin 13 relative to the cap inner counterbored surface 23, it will be appreciated that relatively slight transverse movement of said hinge pin in a plurality of directions allows for the hinge pin 13 and the hinge 11 of the closure member 5 to facilitate accurate seating of said closure member upon the annular valve seat 10 during the course of operation. It will be appreciated that the hinge retainer 6 is preferably held snugly in position with relation to the frusto-conical internal surface 8 of the casing by means of the cap threaded shank 26 bearing against the retainer surface 22 in the manner shown in FIG. 1.

In addition, as will be more clearly apparent upon directing attention to FIG. 3, the hinge retainer 6 is provided with the downwardly extending projections or legs 27 and 28 preferably oppositely disposed for purpose of aligning the retainer 6 in position within the valve body by inserting the said legs into the oppositely disposed casing surfaces or guide means 41 and 42 which are machined in the internal surface 8 of the casing 1 and which terminate in the lower portion of the casing at shoulders 29 and 31, respectively, as clearly shown in FIGS. 2 and 3, and thereby locating accurately the relieved portion or aperture 9 in receiving the hinge 11 of the closure member 5.

Figure 5:
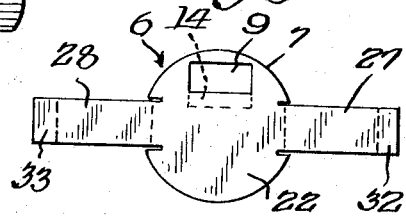
FIG. 5 is a plan view of the hinge pin retainer before the latter member is finally formed in the manner shown for its assembly with the construction shown in FIGS. 1 and 3.
Figure 4:
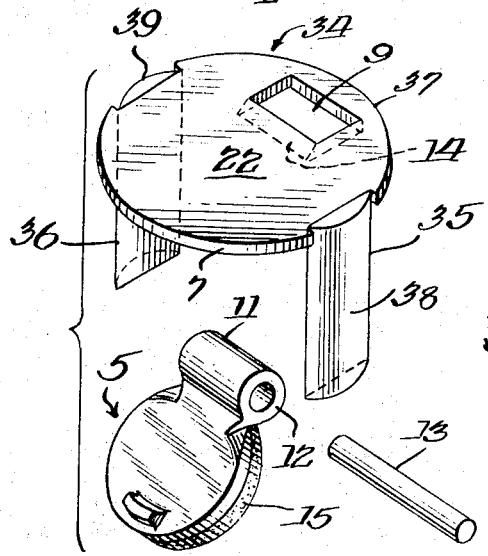
FIG. 4 is a combined view in perspective of the hinge retainer, the hinge pin and the closure member substantially interchangeable with the assembly shown in FIG. 1.

It will be noted that in referring to FIG. 5 that the hinge retainer 6 may be made in any suitable manner such as by fabrication as shown in FIG. 4 or cast (not shown). It has been found that the retainer 6 can be made economically from a simple suitably punched sheet metal stock which is shown in FIG. 5. In this view, it should be noted that the legs 27 and 28 have not yet been bent downwardly as shown in FIGS. 1 to 3 inclusive. It will, of course, be appreciated that the annular frusto-conical surface 8 of the casing 1 can serve as the sole support for the hinge retainer 6. However, in some cases, it may be desirable in order to obtain improved firm positioning within the valve body for the said retainer to provide for the legs 27 to be abuttingly received upon the oppositely disposed casing shoulder portions 29 and 31 as shown more clearly in FIG. 3. It will, of course, be understood that in such cases in which the body surfaces 29 and 31 support the respective legs 27 and 28 it is preferable that the relatively resilient inner end portions 32 and 33 thereof be directed inwardly, enabling adjustment in the over-all length of the legs 27 and 28 to be made during the course of assembly. The said resilient bent portions 32 and 33 being inwardly directed flex and thus permit the hinge retainer member 6 to seat firmly against the casing surface 8. Such arrangement avoids the objection that internal stresses might otherwise be created within the retainer 6 during the course of its assembly in the valve casing.

It will, of course, be appreciated that the lower portion of the body in its reception of the hinge retainer 6 may be of a form differing substantially from that illustrated. In the instant illustration, a ball valve body of the type shown in U.S. Patent No. 3,100,501 has been used for convenience of use, but obviously is not limited to such type of body.

It should be understood also that while it may be desirable to employ the downwardly extending legs 27 and 28 as described there are conditions in which the legs may be dispensed with, depending upon the valve body design. Thus, the hinge retainer 6 in such cases may be of an apertured plate-like configuration. In the latter case, the retainer member 6 may be suitably referenced or marked to indicate its proper rotative position relative to the valve seat 10.

Thus it will be apparent that a novel and durable construction of a swing check valve has been developed possessing a highly desirable flexibility in arranging for the seating of the valve tightly at 10.

As to a modification of the invention, while the hinge retainer 6 has been described as being of a punched out sheet metal form, it will, of course, be appreciated that the said retainer, as shown in FIG. 4, and generally designated 34, may be of a separate sheet material or cast. Such flexibility in selection allows the depending legs 35 and 36 to be attached in any suitable manner to the apertured plate-like member 37 such as by brazing or soldering. It will, of course, be appreciated that such modified form permits of a wider selection of materials to be employed in meeting certain corrosive or erosive conditions in a pipeline. It might also be noted that the legs 35 and 36 can be suitably rounded as at 38 and 39 to fit the inner rounded casing surfaces 41 and 42 more clearly shown in FIGS. 2 and 3. The length of the legs 35 and 36 will be suitably adjusted to provide that the non-rotatable contact of the hinge retainer member 34 with the surface 7 cooperating with the surface 8 of the valve casing is not interfered with.

Figure 6:
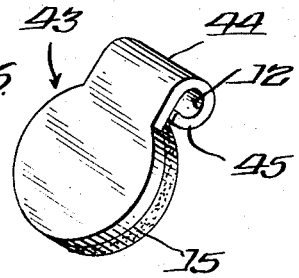
FIG. 6 is a form of wrought closure member suitable for use with the assembly forming the subject matter of this invention.

It should also be understood that in cooperation with either form of hinge retainer hereinabove described the closure member, as shown in FIG. 6 in a modified version designated 43 may be made of a sheet material with the integral hinge portion 44 suitably formed as indicated at 45 to provide the aperture 12 for swingably mounting the closure member as previously described. In this construction, a seat contact or disk member 15 may also be employed and attached by any suitable means to the closure member 43.

It will of course be appreciated that while two embodiments have been described in connection with setting forth the invention, this has been done only as a matter of illustration and not of limitation. Therefore, the invention may be embodied in a wide number of applications falling within the terms of the appended claims.

I claim:

1. In a swing check valve, the combination of a valve body therefor, a swing type closure member hingedly movable to seat within the said body, hinge means for the said closure member, a hinge retainer within said body and relieved to receive at least a portion of said hinge means whereby to support said hinge means on an upper surface of said hinge retainer, said hinge retainer having depending projecting means, guide mean in said body cooperating with said projecting means to thereby position said retainer within said body.

2. The subject matter of claim 1, the said hinge means including a hinge pin spanning said relieved portion of the hinge retainer and being supported thereon, the said hinge pin having the end portions thereof exposed to provide said spanning support on said hinge retainer.

3. The subject matter of claim 1, the said hinge retainer having snug peripheral contact with the upper portion of said body to position said hinge retainer within said body.

4. The subject matter of claim 3, the said body having cap means for inhibiting substantial axial movement of the said hinge retainer relative to said body.

5. The subject matter of claim 2, cap means on said body having an inner peripheral surface for inhibiting substantial axial movement of said hinge pin.

6. In a swing check valve, the combination of a valve body therefor, a swing type closure member hingedly movable to seat within the said body, a hinge pin for the said closure member, a hinge retainer relieved to provide end supports at opposite end portions of said hinge pin whereby to permit said hinge pin to be limitedly rotatable and movable transversely on an upper surface of said hinge retainer to impart self alignment of the closure member with the body seat, guide means in said body, said hinge retainer having depending projection means adapted to be received by said guide means to thereby position said retainer within said body.

7. The subject matter of claim 6, the relieved portion of said hinge retainer being formed on an upper portion thereof to permit predetermined hinged movement of the said closure member.

8. The subject matter of claim 6, the said depending legs at an inner end portion thereof being bent to permit predetermined resilience in the mounting of said hinge retainer within said body.

9. The subject matter of claim 6, the said hinge retainer being apertured to receive a hub portion of said hinge means and being supported on an inner annular shoulder in said body.

10. The subject matter of claim 1, the said hinge retainer being snugly received in an upper portion of said casing, and being substantially of plate-like configuration.

11. The subject matter of claim 10, the said hinge retainer aperture engaging an upper portion of said hinge means whereby to hold said hinge retainer and said hinge means in substantially interlocked relation when said hinge means is in said supported position.

12. The subject matter of claim 6 and further including a cap adapted to inhibit axial movement of said hinge pin, said projection means comprising oppositely disposed legs, the outer surface portions being rounded.

References Cited

UNITED STATES PATENTS 345,420  7/1886  Eskholme _____ 137—527.4

ALAN COHAN, *Primary Examiner.*